United States Patent [19]
Smith

[11] 3,800,167

[45] Mar. 26, 1974

[54] CIRCUITS FOR PRODUCING CONTROLLED PULSES

[75] Inventor: Stephen Clifford Smith, Stoke-on-Trent, England

[73] Assignee: International Computers Limited, London, England

[22] Filed: Oct. 30, 1972

[21] Appl. No.: 301,786

[30] Foreign Application Priority Data

Nov. 2, 1971 Great Britain .................... 50786/71

[52] U.S. Cl. .................. 307/265, 307/261, 307/262

[51] Int. Cl. .......................... H03k 1/18, H03k 5/04

[58] Field of Search ........... 307/228, 261, 262, 265, 307/269; 328/727; 323/22 SC

[56] References Cited

UNITED STATES PATENTS 3,365,654 1/1968 Johnston .............................. 323/22

3,548,318 12/1970 Yorksie .......................... 307/228 X 3,555,304 1/1971 Magee ................................ 307/262

*Primary Examiner*—John Zazworsky

*Attorney, Agent, or Firm*—Hane, Baxley & Spiecens

[57] ABSTRACT

A circuit for producing controlled pulses includes switch means for sampling a full wave rectified a.c. signal, the switch means passing a portion of each half cycle to an averaging circuit means to compare the output of said averaging circuit with a ramp voltage, the comparison means producing an output pulse upon said ramp voltage exceeding the output of said averaging circuit and feed back means responsive to said output pulses for controlling the operation of said switch.

3 Claims, 2 Drawing Figures

CIRCUITS FOR PRODUCING CONTROLLED PULSES

FIELD OF THE INVENTION

The present invention relates to circuits for producing controlled pulses.

SUMMARY OF THE INVENTION

According to the present invention, a circuit for producing controlled pulses includes switch means for sampling a full wave rectified a.c. signal, the switch means passing a portion of each half cycle to an averaging circuit, means to compare the output of said averaging circuit with a ramp voltage, said comparison means producing an output pulse upon said ramp voltage exceeding the output of said averaging circuit and feedback means responsive to said output pulses for controlling the operation of said switch.

BRIEF DESCRIPTION OF THE DRAWING

A circuit arrangement embodying the present invention will now be described, by way of example, with reference to the accompanying drawing, in which.

DESCRIPTION OF THE PREFERRED EMBODIMENTS

Figure 1:
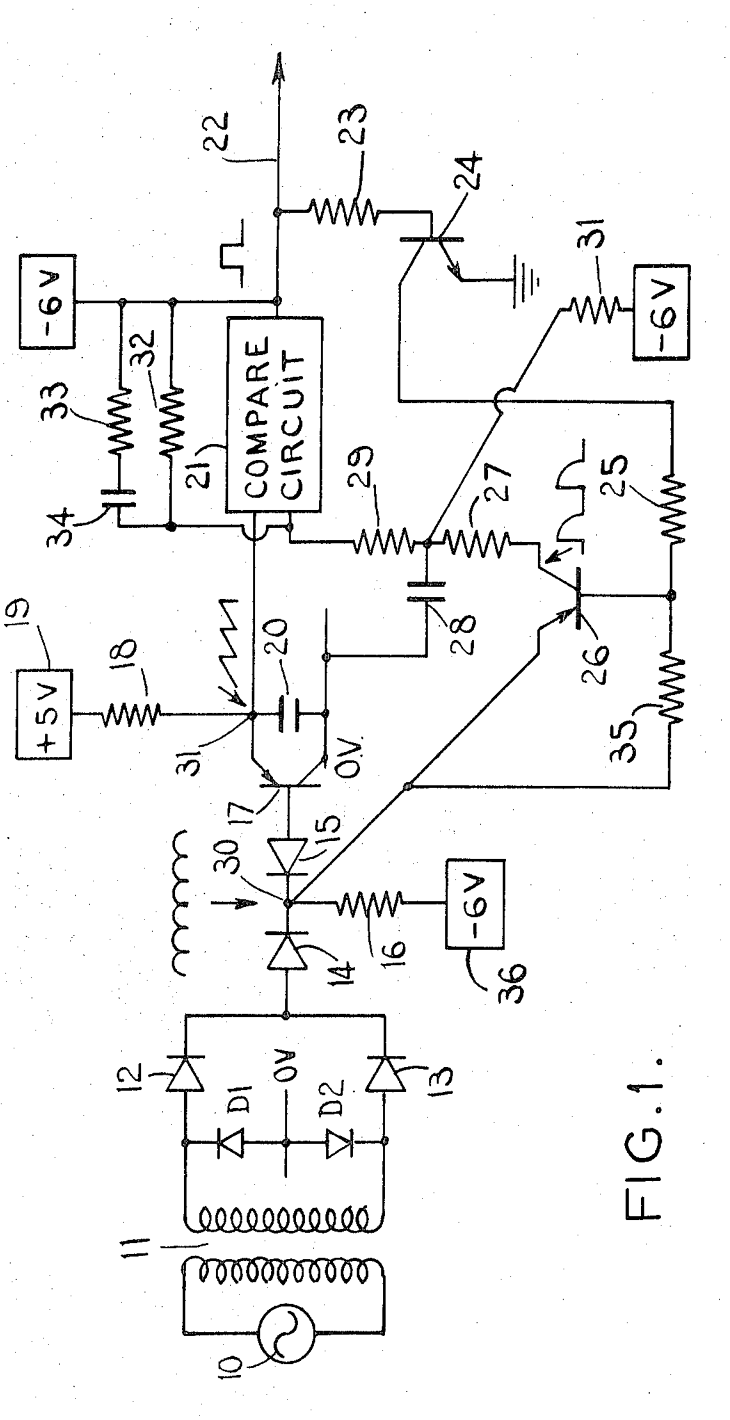
FIG. 1 shows in schematic form a circuit for producing controlled output pulses from an input a.c. source, and FIG. 2 schematically illustrates a modified form of the circuit of FIG. 1.

Referring now to FIG. 1, there is shown a circuit for producing an output pulse on an output line 22 with the timing of the leading edge of the output pulse being controlled.

An a.c. source 10 is connected across the primary winding of a transformer 11 whose secondary winding is connected to diodes 12, 13, D1 and D2. A diode 14 is connected to the diodes 12 and 13 and to a point 30. The point 30 is connected to a diode 15 and to a negative d.c. source 36, through a resistor 16. The base of a transistor 17 is connected to the anode of the diode 15 while the collector thereof is connected to a O v. rail. A ramp generating circuit in the form of a d.c. source 19, a resistor 18 and a capacitor 20 is also connected to the O v. rail. The emitter of the transistor 17 is connected to the junction 31 of the resistor 18 and the capacitor 20. The junction 31 is connected to a first input of a two-input compare circuit 21, the output of which is a pulse produced on line 22. The compare circuit can be a non-linear integrated circuit providing a differential comparator whose output remains at a first level when its first input is at a lower level than its second input and rapidly changes to a higher level when its first input rises to a level exceeding that of the second input.

A feedback circuit including a resistor 23, a transistor 24 and a resistor 25 is connected between the output line 22 and the base of switching a transistor 26. The emitter of the switching transistor 26 is connected to the point 30 while the collector is connected to a resistor 27. A capacitor 28 is connected between the O v. rail and the junction of the resistor 27 and a resistor 29, with the latter resistor being connected to a second input of the compare circuit 21.

In operation, the a.c. input to the transformer 11 is rectified by the network of diodes D1, D2, 11 12, and

14 so as to produce at the point 30 a full wave rectified a.c. comprising a series of positive going half cycles. Upon each positive half cycle decreasing to a zero level, this occurring twice in every full cycle of the a.c. input, the voltage across the resistor 16 and derived from the negative voltage source 36 will render the diode 15 conductive and this will cause the transistor 17 to become conductive. At other points during the cycle the diode 15 blocks the positive half cycles so that the transistor is held in an "off" or non-conducting condition.

The source 19 charges the capacitor 20 through the registor 18, the charging taking place whilst the transistor 17 is cut-off. When the transistor 17 is switched on, the capacitor 20 is discharged. As the transistor 17 is switched on twice during each complete cycle of the a.c. input it follows that the capacitor 20 is likewise charged and discharged twice in each full cycle, thereby producing at the point 31 a saw tooth voltage having a frequency of twice the input a.c. frequency.

Since the capacitor 20 is connected to the O volt rail the sawtooth voltage or ramp voltage is tied to the O volt rail. This sawtooth voltage is applied as the first input to the compare circuit 21.

The compare circuit 21 is used to compare the sawtooth voltage with a second input applied across the resistor 29 (this second input will be considered in detail hereinafter) and to produce as output rectangular pulses on the output line 22.

The output pulses on the output line 22 are fed to the base of the transistor 24 through the resistor 23. The pulses cause the transistor 24 to conduct and to apply the leading edge of the pulses on the line 22, through the resistor 25 to the base of the transistor 26, to render the latter conductive. Since the emitter of the transistor 26 is connected to the point 30, the emitter receives the positive going half cycles of the rectified input. Since the transistor 26 is triggered by the leading edge of the output from the compare circuit 21, the output of the transistor 26, which appears at the collector thereof comprises a series of positive sine wave half cycles with the front portion of each half cycle switched out. This wave form is applied through the resistor 27 to the capacitor 28 which latter is tied to the O volt rail. The combination of the resistor 27 and the capacitor 28 integrates the half sine wave and in so doing averages out the wave form to produce an averaged signal, which is level adjusted or shifted by the resistor 29 and is applied as the second input to the compare circuit 21.

It will be apparent that the type of comparison made by the compare circuit is such that a square pulse produced on the line 22 is produced at the instant when the amplitude of the ramp voltage reaches the level of the averaged signal appearing across the capacitor 28 and the resistor 29. Since the timing of the averaged signal, and that of the ramp voltage is related to positive half cycles of the rectified input it will be seen that the timing of the leading edge of the output pulses on the line 22 will be controlled with regard to variations in the amplitude of the wave form appearing at the point 30.

Thus, for example, should the amplitude at the point 30 decrease by for instance 10 percent the averaged signal appearing across the resistor 29 will likewise be reduced by 10 percent. This means that the sawtooth wave form will reach the amplitude level of the reduced averaged signal earlier, at a lower point along the ramp.

Consequently, the compare circuit 21 will be able to effect the comparison earlier in the cycle and thus produce an output signal on the output line 22 with an earlier leading edge. Thus, the transistor 26, will be triggered to its conductive state earlier than would be the case in the absence of the 10 percent amplitude reduction in the input signal, so that a greater portion of the half sine wave signal will be passed by the transistor 26. This in turn increases the amplitude of the averaged signal and results in the ramp signal having to move to a higher point (on a later time in the half cycle) in order to attain the averaged signal level. In this way, a feedback regulation loop is established, the net effect of which is to accelerate the onset of the leading edge of the output pulse by an amount related to the decrease in amplitude of the signal at point 30, so as to tend to maintain the averaged signal appearing across the capacitor 28 and the resistor 29 at a substantially constant value. Similarly, it will be seen that if the amplitude at point 30 increases, the circuit will act to delay the onset of the leading edge of the output pulse by an amount related to the amplitude increase, so as to tend to maintain the averaged signal at a substantially constant value. In summary, the effect of the circuit is the tend to maintain the averaged signal at a substantially constant value irrespective of any fluctuations in the voltage of the a.c. source 10.

In use of the circuit described above, the output pulse on the line 22 is typically applied as a control signal to a silicon controlled rectifier (SCR) or triac (not shown) which controls the supply of current from the source 10 to a load (also not shown) e.g., an electric motor. The SCR or triac is thus triggered at the leading edge of the output pulse, and will remain conducting until the end of the half-cycle when the voltage from the source 10 drops to zero. It will be seen that, in such an application, the average current supplied to the load via the SCR or triac will be proportional to the averaged signal appearing across the capacitor 28 and resistor 29. Since this averaged signal is maintained at a substantially constant value as described above, it follows that the average current in the load will also be maintained at a substantially constant value irrespective of any fluctuations in the voltage of the a.c. source 10.

Hence, in the case where the load is an electric motor, the action of the circuit is such as to maintain the torque developed in the motor substantially constant, irrespective of fluctuations in the source 10. Such a constant torque factor is particularly useful in relation for motors utilised in the drive of tape reels used in connection with data storage.

The resistors 29, 32, 33 and the capacitor 34 apply a controlled amount of hysteresis to the compare circuit to prevent spurious oscillations arising in the second input to the compare circuit.

The resistor 35 connected in the emitter base circuit of the transistor 26 is provided to ensure reliable operation over a wide range of temperatures.

Figure 2:
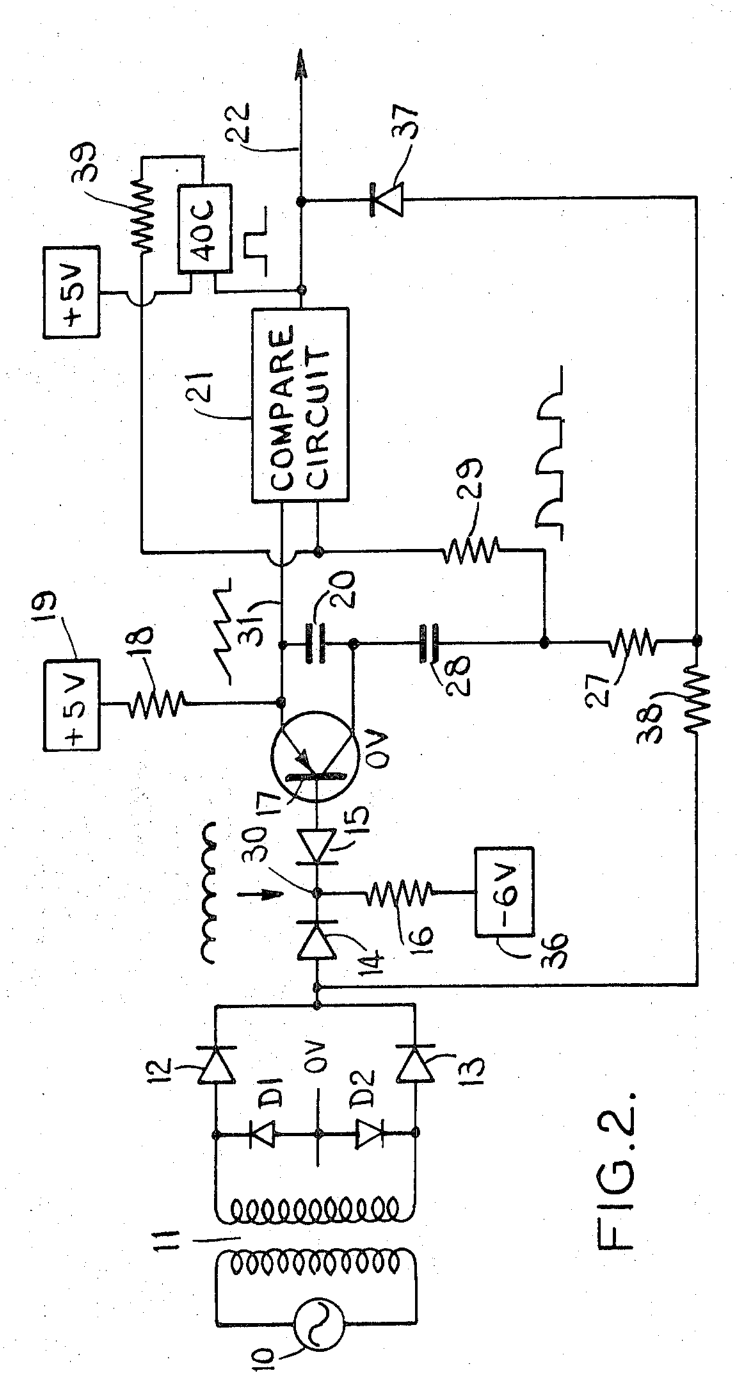

Referring now to FIG. 2 this illustrates a modified form of the circuit of FIG. 1. For convenience components utilised in FIG. 2 which have their counterparts in FIG. 1 will be given the same reference numerals. The principal difference between the circuits of FIGS. 1 and 2 is that the transistors 24 and 26 and the resistances 23, 25 and 35 are replaced by a diode 37 series connected with a resistance 38. The junction of the diode 37 and the resistance is connected to the resistance 27. The resistance 38 is connected to the junction between diodes 12, 13 and 14. In other words the switch circuit defined by the transistors 24, 26 and the resistors 23, 25 and 35 is replaced by a switch circuit including the diode 37 and resistor 38.

The resistances 32, 33 and the capacitor 34 of FIG. 1 have been replaced by a resistance 39 and a single shot multivibrator 40C comprising an integrated circuit known as an ICP55. This latter mentioned circuit serves to increase the noise immunity of the circuit, and ensures that there is only a single output pulse per input mains half cycle.

The second input of the comparator 21 is applied by way of a resistance 39 to the output of the multivibrator. This feature allows a greater swing for the mains input over which the circuit is usable.

The circuit of FIG. 2 operates in a similar manner in that of FIG. 1 with the resistor 18 and capacitor 20 forming a ramp generator which is switched by the transistor 17, in a manner similar to that of FIG. 1. The feed back from the output line 22 is controlled by the diode 37, the arrangement of the latter in conjunction with the resistor 38 ensures that the resistance 27 in conjunction with the capacitor 28 averages out the output so that the wave form at the resistor 27 is the same as that at corresponding resistor 27 in the circuit of FIG. 1. Since the wave forms applied to the two inputs of the compare circuit 21 are the same in FIGS. 1 and 2, it follows that the operation of the compare circuit and the output thereof are the same in both Figures.

I claim:

1. A circuit for producing controlled pulses from an input a.c. signal, comprising:

means for full-wave rectifying said input signal; sampling means for sampling the full-wave rectified signal to produce a sampled signal comprising a portion of each half cycle of the full-wave rectified signal; means for averaging said sampled signal to produce an averaged signal;

means for generating a ramp voltage during each said half cycle;

means for comparing said averaged signal with said ramp signal to produce a said controlled pulse whenever said ramp signal exceeds said averaged signal; and means for applying said pulses to said sampling means to control the operation of said sampling means.

2. A circuit according to claim 1, wherein said sampling means comprises a semiconductor switching circuit connected to be triggered into a conducting state in response to a said pulse.

3. A circuit according to claim 1 wherein said ramp voltage generating means is connected to said full-wave rectifying means, whereby said ramp voltage is reset when said full-wave rectified signal drops to zero.

* * * * *